Figure 1:
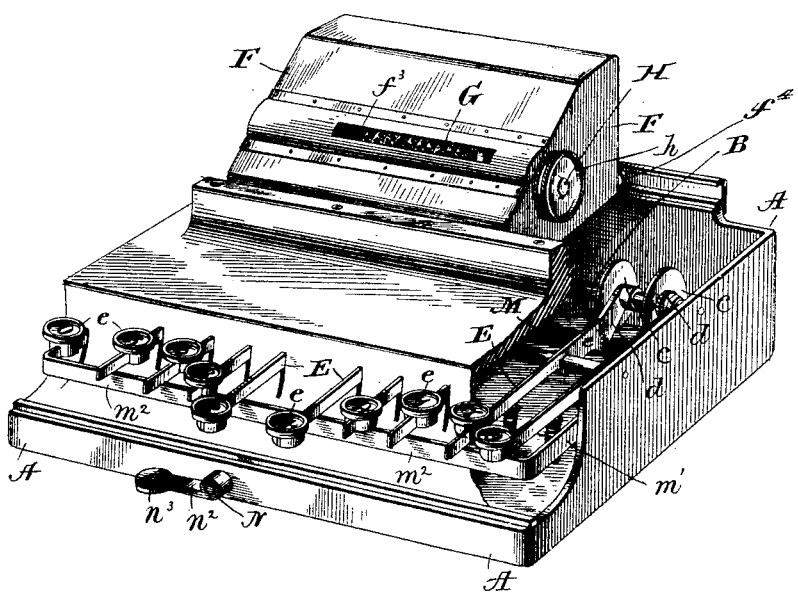

(No Model.)　　　　　B. H. PHILLIPS.　　5 Sheets—Sheet 1.
ADDING MACHINE.

No. 497,058.　　　　　Patented May 9, 1893.

Witnesses　　　　　　　　　　　　　　Inventor
Jas. E. Hutchinson　　　　　　　　　Bradley H. Phillips
C. M. Sweeney　　　　　　　by Macleod, Calver & Randall,
　　　　　　　　　　　　　　　　　his Attorneys.

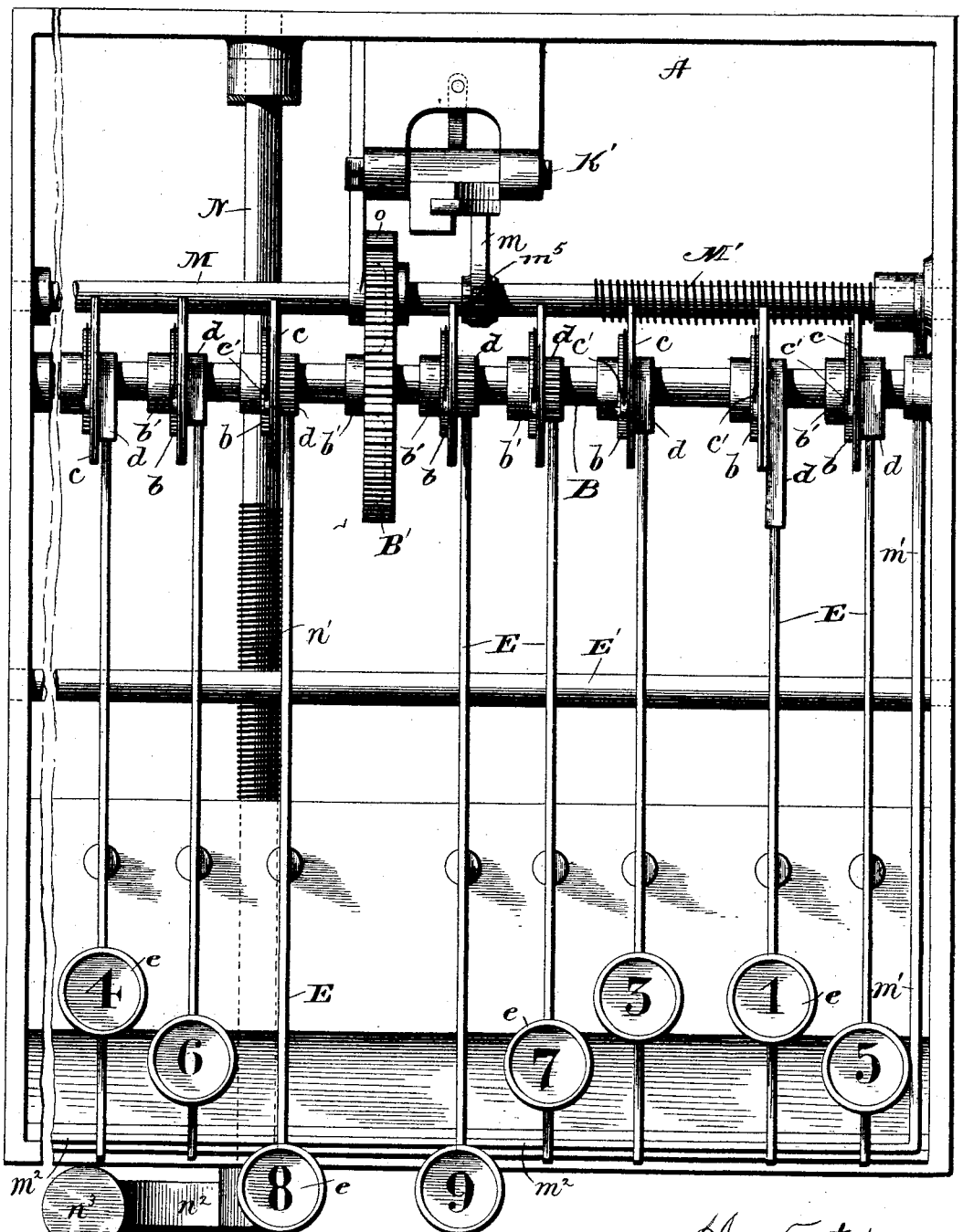

(No Model.) 5 Sheets—Sheet 3.
B. H. PHILLIPS.
ADDING MACHINE.
No. 497,058. Patented May 9, 1893.
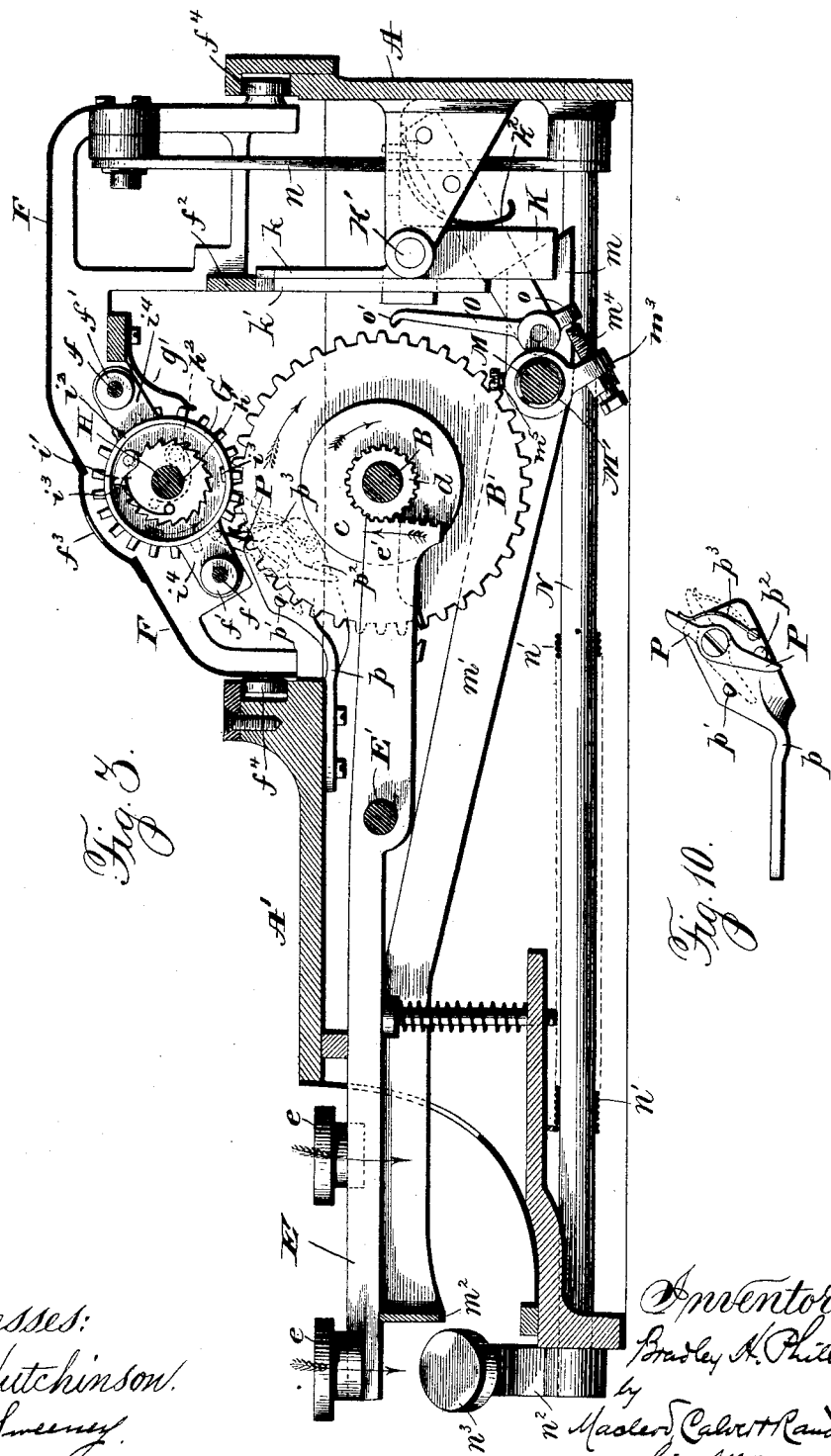

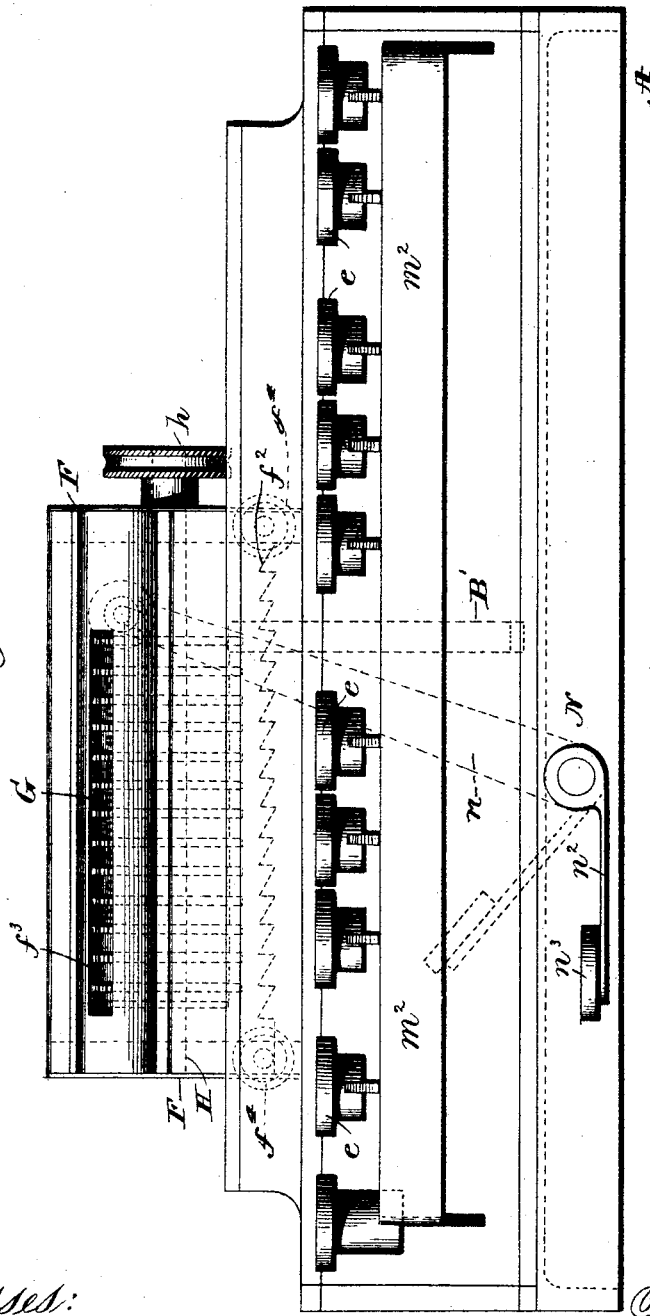

(No Model.) 5 Sheets—Sheet 5.
B. H. PHILLIPS.
ADDING MACHINE.
No. 497,058. Patented May 9, 1893.
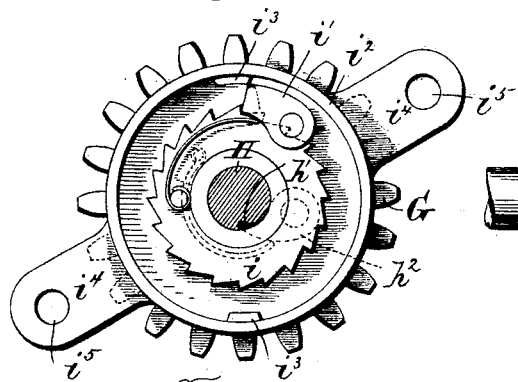
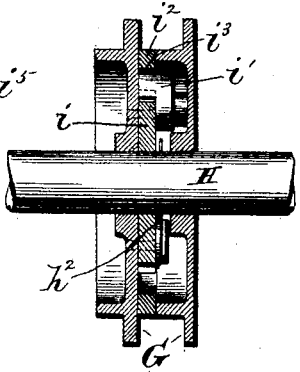
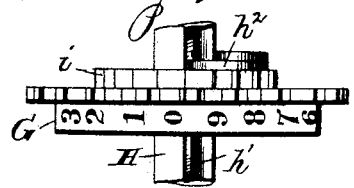
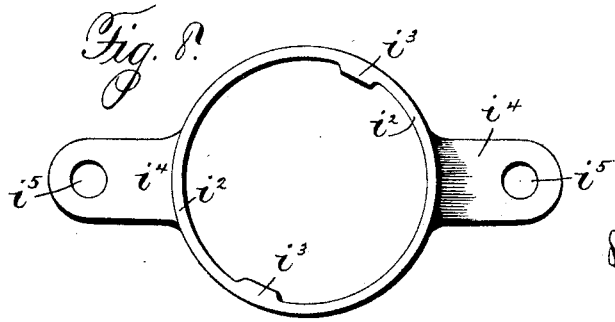
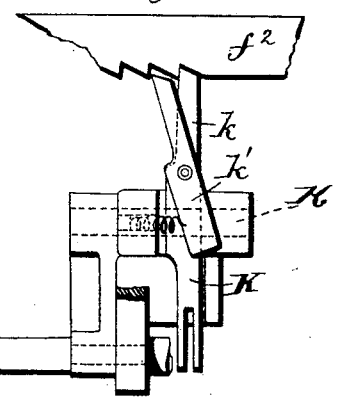
Witnesses:
Jas. E. Hutchinson.
C. M. Sweeny.
Inventor,
Bradley H. Phillips
by Macleod, Calver & Randall
his Attorneys.

UNITED STATES PATENT OFFICE.

BRADLEY H. PHILLIPS, OF FREDONIA, NEW YORK.

ADDING-MACHINE.

SPECIFICATION forming part of Letters Patent No. 497,058, dated May 9, 1893.

Application filed July 30, 1892. Serial No. 441,666. (No model.)

*To all whom it may concern:*

Be it known that I, BRADLEY H. PHILLIPS, a citizen of the United States, residing at Fredonia, in the county of Chautauqua and State of New York, have invented certain new and useful Improvements in Adding-Machines, of which the following is a specification, reference being had therein to the accompanying drawings.

My invention relates to that class of arithmometers or adding machines in which registering or numeral wheels are operated from a single set of levers so connected therewith that the movement of each lever will give a different rotative movement to the numeral wheels, thereby permitting different values or numbers to be represented according to which particular lever, corresponding to a certain number, is pressed upon or actuated by the operator; and my invention has for its object to improve the class of machines referred to in such a manner as to provide a machine having capacity for very high numbers without making the same objectionably complicated.

In carrying my invention into effect I mount upon a main or driving shaft what may be termed a driving gear wheel having teeth to engage teeth upon the numeral wheels which latter are adapted for independent rotation upon a shaft mounted upon a traveling carriage in such a way that the numeral wheels are successively presented to the main driving wheel. The driving shaft is provided with a series of ratchet wheels carried by suitable collars rigidly attached to said shaft, and mounted loosely upon said shaft is a series of gears or sectors each of which is rigid with a disk or plate carrying a pawl engaging one of the said ratchet wheels. The sectors or gear wheels referred to are of different diameters or radii and are engaged by gear sectors formed on the ends of operating levers the inner arms of which are made of different lengths so that a uniform downward movement of the outer or operating ends of said levers, when pressed upon by the fingers of the operator, will impart different movements to the driving shaft with which they are connected, thereby providing for rotative movements of said shaft varying in extent a distance ranging from one tooth on the main driving gear wheel up to a distance equal to nine teeth thereof. The key levers are so arranged that the downward movement of the outer end of any one of them will operate a spacing mechanism one part of which consists of an escapement engaging with a rack bar formed on the traveling carriage so that at each movement of an operating lever said carriage will be advanced to the extent of the thickness of one of the numeral wheels, thereby presenting the latter successively to the action of the main driving wheel which latter is stationary relative to said carriage and to the numeral wheels mounted thereon.

To insure accurate operation of my machine a suitable stop is provided for the main driving wheel to prevent the latter from overthrowing, and stops may also be provided for the numeral wheels for the same purpose.

In the drawings Figure 1 is a perspective view of my improved machine, with a portion of the casing removed. Fig. 2 is a plan view of the machine, with the top casing and traveling carriage removed. Fig. 3 is a vertical longitudinal section from front to rear, and Fig. 4 is a front view of my improved machine. Figs. 5, 6, 7, and 8 are detail views of the numeral wheels and adjacent parts. Fig. 9 is a detail view of the escapement mechanism, and Fig. 10 is a detail view of the stopping mechanism for the numeral wheels to prevent the same from overthrowing.

A denotes a suitable frame or casing in which is mounted the main shaft B provided with the main driving or gear wheel B', which is rigidly secured thereto so as to rotate therewith. The said shaft B is provided with a series of ratchet wheels $b$ formed on collars $b'$ attached to the said shaft B.

Mounted loosely upon the shaft B are a series of disks $c$ each of which is provided with a spring pressed pawl $c'$ arranged to engage the ratchet wheel $b$ adjacent thereto, to rotate said ratchet wheel in one direction, but to ride freely over the same in the opposite direction. Rigid with each of the said disks $c$ and loose on the shaft B is a sector or small gear wheel $d$, these sectors or gear wheels $d$ being of different radial extent so that the outer face of each one thereof is at a different distance from the center of the shaft B than any of the others. These sectors or gear wheels are engaged by geared sectors $e'$ formed on the inner ends of the key levers E provided at their outer ends with finger buttons $e$. Where these devices $d$ are small in radial extent they are preferably made as wheels, but when of larger extent, and consequently have lesser axial or rotative movement, they are preferably made as sectors. Both forms are shown in Fig. 2. The levers E are pivoted on a rod or bar $E'$ running cross-wise of the machine, and the inner arms of said levers are of varying lengths, as will more clearly be seen from Fig. 2, so that rotative movements of different extent will be imparted to the main or driving shaft B, and to the driving gear wheel $B'$ carried thereby, from uniform movements of the said operating levers, owing to the varying lengths of the inner arms of said levers and of the varying radial lengths or extents of the sectors or gears $d$.

Mounted to run by wheels $f^4$ (see Figs. 1, 3, and 4) upon suitable guideways formed on the frame A and the top or casing plate $A'$ secured to the said frame is a traveling carriage F which carries a series of registering or numeral wheels G each of which has a peripheral series of numerals from 0 to 9 inclusive, or two series of numerals may be formed on each of said wheels, the number of the figures on each wheel being equal to the number of teeth thereon. The numeral wheels are mounted upon a normally stationary shaft H in the said carriage F, said wheels being adapted to rotate independently of each other upon said shaft, but being connected with each other in such a way that when one wheel is moved around to a certain extent it will become connected with the next wheel to the left in such a manner as to turn the latter to the extent of one tooth, each tooth on the numeral wheels corresponding to a numeral. The wheels G are held from rotating, except at times when they are to be positively moved, by means of springs $g'$ engaging the teeth of the said wheels, but which yield to permit the latter to move when they are positively rotated. The shaft H is provided with a handle or finger wheel $h$ by which it may be rotated when desired, and the said shaft is also provided with a longitudinal groove $h'$ (see Fig. 5) one face or side of said groove being radial and the other tangential. Connected to each one of said wheels G is a spring pressed pawl $h^2$ (see dotted lines Figs. 3 and 5) which, when the shaft H is turned in one direction by its finger wheel or handle, will fall into the said groove in such a manner as to engage the radial face thereof, the latter causing the numeral wheel with which it is connected to be turned with the said shaft; but when the latter is turned in the opposite direction the free end of the pawl will merely fall idly into the said groove and will immediately be lifted therefrom by the tangential face of the latter. When the numeral wheels are turned in their normal direction, in operation, the pawls $h^2$ will ride over the groove $h'$ without engaging therewith, said pawls, at such time, passing freely over the tangential face of the groove $h'$.

To each of the numeral wheels is attached a ratchet wheel $i$ having a number of teeth corresponding to the number of numerals on said numeral wheel, and to the adjoining face of the numeral wheel next to the right is pivoted a spring pressed pawl $i'$ normally pressed outward against the inner face of a stationary ring $i^2$, the rings $i^2$ being rigidly mounted between every pair of numeral wheels in a manner to be hereinafter explained, and being provided on their inner faces with one or more cams or projections $i^3$. It will be seen that each pawl $i'$ is arranged to engage with the ratchet teeth of the next higher numeral wheel but is normally held out of engagement with the teeth of the ratchet wheel $i$ until in the rotation of the numeral wheel with which the pawl is connected said pawl comes opposite a cam or projection $i^3$ on the ring $i^2$ when the said projection will force the said pawl inward against the stress of its spring and cause it to engage the ratchet wheel next to the left and move the same forward to the extent of one tooth, and the said pawl will then clear said projection so that it can be thrown out of engagement from the ratchet wheel by its spring. Thus when a numeral wheel has been rotated to the extent of a series of numerals, or, in other words, when a numeral wheel has been turned so that the numeral 0 is shown through the exhibiting slot of the register, further rotation of the said numeral wheel will bring the pawl into engagement with a projection $i^3$ on the ring $i^2$, and thus cause the pawl to engage the ratchet and turn the numeral wheel next to the left to the extent of one tooth. The rings $i^2$ are formed with arms $i^4$ having holes $i^5$ to receive the rods $f$ attached to the carriage F, suitable sleeves $f'$ (see Fig. 3) being placed on said rods between said arms to hold them separated so that the arms and the rings carried thereby are held rigidly in place.

The carriage F is provided with a ratchet bar $f^2$ which is engaged by an escapement consisting of an arm $k$ formed on a rocking bar K mounted on a rod $K'$ and a pawl $k'$ pivoted to the said arm $k$, the said pawl and arm being pointed at their outer ends to swing past the teeth of the ratchet bar (see Figs. 3 and 9) in a well-known manner in the operation of escapements. The rocking bar K is engaged at its lower end by the inclined outer end of an arm $m$ held by a set screw $m^5$ to a rock shaft M, the said shaft having rigidly attached thereto a frame consisting of the arms $m'$ connected by a cross bar $m^2$ which is beneath the outer ends of the key levers E, so that when the outer end of one of the said levers is depressed the said rock-shaft will be operated to rock the bar K, and thus operate the escapement to permit one tooth of the rack bar $f^2$ to pass the same.

The rock-shaft M is provided with a torsional spring $M'$ which normally holds the arms $m'$ and their connecting cross bar $m^2$ elevated. The rocking-bar K is normally held in a vertical position by the spring $k^2$ against the stress of which it is rocked by the arm $m'$. The rock shaft M is provided with an arm $m^3$ the outer end of which is furnished with a projection herein shown as a screw $m^4$ tapped in the end of the said arm so that it may be adjusted to any desired position, the upper or projecting end of the said screw being arranged to engage the tail $o$ of a stopping lever O having at its upper end a finger $o'$ which projects between the teeth of the main driving gear wheel B' to prevent the said wheel from overthrowing. The arm $m^3$ on the shaft M is so arranged that the projecting end of the screw $m^4$ will not engage the tail $o$ of the stopping lever O until the downward movement of the outer end of a key lever E is nearly completed so that the finger $o'$ of the said stopping lever or device will not be moved into the path of rotation of the teeth of the gear wheel B' until just as the movement of the key lever is being completed, this movement of the stopping lever being secured by the proper adjustment of the screw $m^4$.

To prevent the numeral wheels from overthrowing I provide a stopping lever P which is pivoted upon a bracket $p$ arranged adjacent to the main driving gear wheel B', the said bracket being provided with pins $p'$ $p^2$, and attached thereto is also a light spring $p^3$ which presses against the said stopping lever in such a manner as to hold it in position to be engaged by the teeth of that one of the numeral wheels which is next to the left to the numeral wheel in gear with the main driving gear wheel B'. Thus when the numeral wheel which is being rotated by the main driving gear wheel is in such position as to cause the numeral wheel next to the left thereof to be rotated therewith the stopping lever P will be moved from the position shown in full lines in Fig. 10 to the position shown in dotted lines in said figure, when the tail thereof will be in contact with the pin $p'$ in which positively stopped position it will remain until the next feeding movement of the carriage when as that one of the numeral wheels with which it is engaged moves past it, it will instantly be returned to its normal position by the spring $p^3$ ready for operation in connection with the next numeral wheel. The carriage F is advanced forward, or toward the right, by an arm $n$ connected at its upper end to said carriage and attached at its lower end to a rock-shaft N on which is wound a torsional spring $n'$ which normally presses the carriage forward, or toward the right, the said shaft N being provided at the front of the machine, outside of the casing A, with an arm $n^2$ having a finger button $n^3$ which may be pressed upon to return the carriage to its first position when the entire series of numeral wheels have passed the driving gear wheel B' on the main shaft B.

The carriage F is provided with a casing in the top of which is formed a slot $f^3$ through which the characters on the numeral wheels appear, the said slot being of such width as to permit only a single row of characters to show through the same.

In the operation of my machine the numeral wheels are first set in such a way that a row of naughts will appear through the slot $f^3$, this being done by turning the shaft H backward by means of the finger wheel $h$ thereby causing the pawls $h^2$ to fall into the groove $h'$ in the said shaft where the ends of the said pawls will be engaged by the radial side of the said groove, and when all of the said pawls have thus fallen into the said groove all of the numeral wheels will turn together with the said shaft so as to set the said wheels for the commencement of an adding operation. The horizontal row of figures to be added is now caused to appear through the exhibiting slot above the numeral wheels by successively depressing the outer ends of the levers E by pressing upon the buttons $b$, the lever farthest to the right having on its button the numeral which is to appear through the registering slot first being depressed; and the other levers, having on their buttons the proper figures, being successively depressed in their regular order going toward the left. The operation of each lever E causes a rotative movement to be imparted to the main shaft B and to the main driving gear wheel B' carried thereby, the latter engaging with a numeral wheel at each operation, and the carriage being fed forward by the operation of the feeding and escapement mechanism, hereinbefore described, to the extent of one numeral wheel at each depression of an operating lever. Thus when the entire series of figures in a horizontal row have been registered the same will appear through the registering slot $f^3$ in the casing of the carriage. When a numeral wheel has been rotated so as to have performed an entire revolution, or a partial revolution corresponding to the entire series of numerals thereon, it will be connected by the pawl and ratchet mechanism herein before described with the adjacent numeral wheel next to the left, and will rotate the said adjacent numeral wheel to the extent of one tooth. Thus when the figure 9 is exhibited upon the units numeral wheel, or the numeral wheel farthest to the right, and the key corresponding to the numeral 3 be next depressed the units numeral wheel will be rotated to the extent of three numbers causing the figure 2 on the units numeral wheel to appear through the exhibiting slot, and in making this movement the units numeral wheel will be connected with the tens numeral wheel and cause the latter to be moved to the extent of one tooth exhibiting the figure 1 thereon through the slot and thus showing the entire number or sum 12 on the register. The same principle of action occurs with all of the other numeral wheels, each numeral wheel, when it rotated to the extent of an entire series of figures, being connected with its adjacent numeral wheel next to the left to cause the latter to rotate, and, in some instances, as where a series of nines show upon the register and another figure is to be added thereto, several numeral wheels will be caused to rotate, each one by the other, to exhibit the proper total number or sum upon the register or through the index slot.

If it be desired to add a column of figures vertically my machine may be used for such operation without any lateral or traveling movement of the carriage, this being effected simply by loosening the screw $m^5$ which holds the arm $m$ on the rock shaft M, thereby disconnecting said arm from the escapement so that the latter will not be operated to permit the carriage to advance. It will therefore be understood that I do not wish to limit my invention to the use of a traveling carriage, as, for some purposes, the numeral wheels may remain stationary and may be operated by the key levers, rotating shaft, the main driving gear wheel thereon, and the system of gears or segments for differentially rotating said shaft from the key levers, as herein before described.

Having thus described my invention, I claim and desire to secure by Letters Patent—

1. In an adding machine, the combination with a series of operating levers, the inner arms of which are of different lengths, and which are provided at their inner ends with gear segments, of a main rotating shaft provided with a series of gear wheels or segments of different radial extent and with which the gear segments on the said levers mesh, a main driving gear wheel carried by said shaft, a traveling carriage movable laterally relative to said main driving gear wheel, a series of independently rotating numeral wheels mounted in said carriage, a spring for advancing or pressing the said carriage forward, and an escapement mechanism connected with the said operating levers and actuated thereby, and serving to regulate the forward movement of the said carriage by said spring.

2. In an arithmometer or adding machine, the combination with a series of operating levers, a rotating shaft with which said levers are connected so that each will impart a different rotative movement thereto, and a main driving gear wheel carried by said shaft, of a traveling carriage movable laterally relative to said main driving gear wheel, a series of independently rotating numeral wheels mounted in said carriage, a spring for advancing or pressing said carriage forward, and an escapement mechanism connected with the said operating levers and serving to regulate the forward movement of the said carriage by said spring.

3. In an arithmometer or adding machine, the combination with a series of operating levers, a rotating shaft with which said levers are connected so that each will impart a different rotative movement thereto, and a main driving gear wheel carried by said shaft, of a traveling carriage movable laterally relative to said main driving gear wheel, a series of independently rotating numeral wheels mounted in said carriage, a spring for advancing or pressing said carriage forward, an escapement mechanism connected with the said operating levers and serving to regulate the movement of the said carriage under the stress of said spring, and a stopping device for the said main driving gear wheel which serves to prevent the latter from overthrowing, and which is also actuated from the said operating levers.

4. In an adding machine, the combination with a series of operating levers the inner arms of which are of different lengths and which are provided at their inner ends with geared segments, of a rotating shaft provided with a series of gears or geared segments of different radial extent and with which the geared segments of the said levers mesh, a main driving gear wheel carried by said shaft, a traveling carriage movable laterally relative to said main driving gear wheel, a series of independently rotating numeral wheels mounted in said carriage, and an automatic feeding mechanism, controlled by said levers, for advancing the said carriage to the extent of the distance from one numeral wheel to another whenever any one of the said levers is operated.

5. In an adding machine, the combination with a series of operating levers the inner arms of which are of different lengths and which are provided at their inner ends with geared segments, of a main rotating shaft provided with a series of gear wheels or segments of different radial extent and with which the geared segments on the said levers mesh, a main driving gear wheel carried by said shaft, and a series of numeral wheels any one of which may be arranged to be rotated by the said driving gear wheel and which are connected together so that each numeral wheel will advance a numeral wheel contiguous to it to the extent of one tooth when the numeral wheel in gear with the said driving gear wheel has been rotated to the extent of a series of numerals thereon.

6. In an adding machine, the combination with a series of operating levers, of a rotating shaft with which the said levers are operatively connected, and a main driving gear wheel carried by said driving shaft, of a traveling carriage movable laterally relative to the said main driving gear wheel and provided with a ratchet bar, a series of independently rotating numeral wheels mounted in said carriage, a spring for advancing said carriage forward, an escapement device operating in connection with said ratchet bar to control the forward movement of the said carriage, and an operating frame for the said escapement device which is actuated by the said operating levers; whereby whenever one of the said levers is depressed the escapement will be actuated to permit the carriage to be advanced a distance equal to that from one numeral wheel to another.

7. In an adding machine, the combination with a series of operating levers, the inner arms of which are of different lengths and which are provided at their inner ends with gear segments, of a main rotating shaft provided with a series of gear wheels or segments of different radial extent, and with which the gear segments on the levers mesh, a main driving gear wheel carried by said shaft, a traveling carriage movable laterally relative to said main driving gear wheel, a series of independently rotating numeral wheels mounted in said carriage and each of which is provided with a ratchet wheel rotating therewith, a pawl or lever rotating with each of said ratchet wheels but which is normally held out of engagement therefrom by a spring, a stationary cam or projection to engage each of said pawls or levers when the numeral wheel with which it is rotating has arrived at a certain point, and to thereby throw the said pawl into engagement with said ratchet wheel against the stress of its spring, and thus rotatively advance the numeral wheel to which the ratchet wheel, thus engaged by said pawl, is attached, to the extent of one tooth on the ratchet wheel.

8. In an adding machine, the combination with a series of operating levers, the inner arms of which are of different lengths and which are provided at their inner ends with gear segments, of a main rotating shaft provided with a series of gear wheels or segments of different radial extent, and with which the gear segments on the levers mesh, a main driving gear wheel carried by said shaft, a traveling carriage movable relative to said main driving gear wheel, a series of independently rotating numeral wheels mounted on said carriage, and each of which is provided with a ratchet wheel rotating therewith, a pawl or lever rotating with each of said ratchet wheels but which is normally held out of engagement therefrom by a spring, stationary rings $i^2$ arranged between the said numeral wheels and provided on their inner faces with cams or projections $i^3$ arranged to engage the said pawls or levers at times and force them inward into engagement with the said ratchet wheels against the stress of their springs, to cause the said ratchet wheels and the numeral wheels connected therewith to be advanced.

9. In an adding machine, the combination with a series of operating levers, of a rotating shaft with which the said levers are connected, so that each will impart a different rotative movement thereto, a main driving gear wheel carried by said shaft, a traveling carriage movable laterally relative to said main driving gear wheel, a series of independently rotating numeral wheels movable with said carriage, a spring for moving said carriage forward, an escapement mechanism connected with the said operating levers, and serving to regulate the forward movement of the said carriage under the stress of said spring, and a stopping device arranged to engage a numeral wheel next adjacent to that with which the said main driving gear wheel is in connection, and serving to prevent the said numeral wheel from overthrowing.

10. In an adding machine, the combination with a carriage, and a series of independently rotating numeral wheels mounted therein, a series of operating levers and intermediate connections for rotating said numeral wheels, a spring for moving said carriage forward, an escapement mechanism for controlling the forward movement of said carriage under the stress of said spring, a returning shaft provided with an operating arm or handle, and having also an arm connected with said carriage; whereby the said arm or handle may be pressed upon to return the carriage to its starting point against the stress of its advancing spring, when desired.

11. In an adding machine, the combination with a series of operating levers, the inner arms of which are of different lengths and which are provided at their inner ends with geared segments, of a rotating shaft provided with a main driving gear wheel and with a series of gears or segments of different radial extent which are loosely mounted on said shaft, and each of which has, rigid therewith, a wheel or disk, a series of ratchet wheels connected with said shaft to rotate therewith, a series of spring pressed pawls carried by said disks and which are arranged to engage said ratchet wheels when the disks move forward, but which ride freely over the same when the disks perform their return movements, and a series of numeral wheels any one of which may be thrown into engagement with the main driving gear wheel.

12. In an adding machine, the combination with a rotating shaft provided with a main driving gear wheel and mechanism for imparting different rotative movements to said shaft, of a traveling carriage, a series of independently rotating numeral wheels mounted in said carriage any one of which may be brought into engagement with the said main driving gear wheel, and a stopping lever, as P, mounted on a stationary support and arranged to engage the numeral wheel which may be next adjacent to that which is in mesh with the said main driving gear wheel.

In testimony whereof I affix my signature in presence of two witnesses.

BRADLEY H. PHILLIPS.

Witnesses:
HENRY CALVER,
CASSIE M. SWEENEY.